United States Patent
Li (10) Patent No.: US 8,629,077 B2
(45) Date of Patent: Jan. 14, 2014

(54) RARE EARTH ALUMINA PARTICULATE MANUFACTURING METHOD AND APPLICATION

(76) Inventor: Yunkui Li, Ann Arbor, MI (US)

( * ) Notice: Subject to any disclaimer, the term of this patent is extended or adjusted under 35 U.S.C. 154(b) by 0 days.

(21) Appl. No.: 12/675,664

(22) PCT Filed: Aug. 29, 2007

(86) PCT No.: PCT/US2007/019052
§ 371 (c)(1),
(2), (4) Date: Jul. 22, 2010

(87) PCT Pub. No.: WO2009/029070
PCT Pub. Date: Mar. 5, 2009

(65) Prior Publication Data
US 2010/0285956 A1    Nov. 11, 2010

(51) Int. Cl.
*B01J 23/00* (2006.01)
*B01J 23/10* (2006.01)

(52) U.S. Cl.
USPC ............ 502/302; 502/303; 502/304; 502/355

(58) Field of Classification Search
USPC .......... 502/302–304, 355; 423/600, 625–631, 423/263
See application file for complete search history.

(56) References Cited

U.S. PATENT DOCUMENTS

| | | | | |
|---|---|---|---|---|
| 2,620,314 | A * | 12/1952 | Hoekstra | 502/8 |
| 3,903,020 | A * | 9/1975 | Sergeys et al. | 502/262 |
| 3,993,572 | A * | 11/1976 | Hindin et al. | 502/304 |
| 4,170,573 | A * | 10/1979 | Ernest et al. | 502/303 |
| 4,868,150 | A * | 9/1989 | Spooner et al. | 502/439 |
| 5,155,085 | A * | 10/1992 | Hamano et al. | 502/303 |

(Continued)

FOREIGN PATENT DOCUMENTS

WO    WO 2006070203 A1 *    7/2006

OTHER PUBLICATIONS

Yamamoto et al., "Structures and Acid-Base Properties of La/Al2O3—Role of La Addition to Enhance Thermal stability of gamma-Al2O3", Chem. Mater. 2003, 15, 4830-4840.*

(Continued)

*Primary Examiner* — Anthony J Zimmer (57) ABSTRACT

A rare earth alumina particulate composition manufacturing method and application are disclosed. The rare earth alumina of the invention is a particulate of porous structure with a molecular formula $(RE_xAl_{1-x})_2O_3$, phase γ or γ+δ characterized by a particle size distribution ranging from 1 to 80 μm with a $D_{50}$ of 5 to 15 μm, a pore size distribution ranging from 0.4-200 nm with an average pore diameter of 8 to 30 nm, a pore volume (PV) raging from 0.5 to 1.2 cc/g and a fresh specific surface area (SA) ranging from 130 to 250 m²/g after calcination at 500-900° C. for 5 to 10 hours. The rare earth alumina retains a SA of greater than 60 m²/g after calcination at 1200° C. for 4 hours and greater than 40 m²/g after calcination at 1200° C. for 50 hours. There is no presence of the α phase or other impurity phases in the long-term aged samples. The rare earth alumina of the invention has a high thermal stability and is a fine three-way catalyst support material. The rare earth alumina is made using wet continuous coprecipitation with a static mixer and a tank reactor featuring simple operation, low cost and high feasibility in industrial production.

17 Claims, 3 Drawing Sheets

(56) References Cited

U.S. PATENT DOCUMENTS

| | | | | |
|---|---|---|---|---|
| 5,397,758 | A | * | 3/1995 | Bouruetaubertot et al. .. 502/303 |
| 5,593,654 | A | * | 1/1997 | Decker et al. ................. 423/625 |
| 6,180,075 | B1 | * | 1/2001 | Lindner et al. ............. 423/213.2 |
| 6,426,443 | B1 | * | 7/2002 | Rossin et al. ................. 588/317 |
| 6,764,672 | B2 | * | 7/2004 | Glazov et al. ................. 423/625 |
| 7,162,963 | B2 | * | 1/2007 | Sauder et al. ................. 111/185 |
| 2002/0160912 | A1 | * | 10/2002 | Morikawa et al. ............ 502/303 |
| 2002/0187894 | A1 | * | 12/2002 | Domesle et al. ............. 502/304 |
| 2004/0127586 | A1 | * | 7/2004 | Jin et al. ........................ 518/715 |
| 2004/0138060 | A1 | * | 7/2004 | Rapier et al. ................. 502/302 |
| 2005/0265920 | A1 | * | 12/2005 | Ercan et al. ................... 423/651 |
| 2007/0161714 | A1 | * | 7/2007 | Rytter et al. .................. 518/718 |
| 2008/0096760 | A1 | * | 4/2008 | Darab ........................... 502/303 |

OTHER PUBLICATIONS

Wachowski et al., "Studies of physicochemical and surface properties of alumina modified with rare-earth oxides I. Preparation, structure and thermal stability", Materials Chemistry and Physics, 37 (1994) 29-38.*

Nair et al., "Pore Structure Evolution of Lanthana-Alumina Systems Prepared through Coprecipitation", J. Am. Ceram. Soc. 83 (8) 1942-46 (2000).*

Wachowski et al., "Studies of physicochemical and surface properties of alumina modified with rare-earth oxides. II. Porous Structure", Catalysis Letters 32 (1995) 123-130.*

* cited by examiner

RARE EARTH ALUMINA PARTICULATE MANUFACTURING METHOD AND APPLICATION

CROSS REFERENCE TO RELATED APPLICATIONS

This application claims the benefit of priority to PCT/US07/19052 filed Aug. 29, 2007, the entire contents of which are hereby incorporated herein by reference.

BACKGROUND OF THE INVENTION

1. Field of the invention

The present invention relates to the field of inorganic complex materials technology, more specifically, the invention relates to rare earth alumina powders retaining a high thermal stability, manufacturing methods and applications. The material of the present invention is especially useful for three-way catalyst supports in mobile engine exhaust converters.

2. Description of the Prior Art

The pollution of the atmosphere mainly comes from mobile engine exhaust consisting of carbon monoxide (CO), all kinds of hydrogen carbon compounds (HC) and nitrogen oxygen compounds ($NO_x$). The three-way catalyst can change most of the pollution compounds into innocuous carbon dioxide, $CO_2$, water $H_2O$ and Nitrogen $N_2$. Therefore it is called an environmental conservation catalyst. The mobile engine exhaust filter is composed of noble metals for catalytic activity (platinum, rhodium and palladium), oxygen storage materials and catalyst support alumina as well as the cordierite honeycomb ceramic that supports all of the powders. As we know, the efficiency of a catalyst is generally related to the interface area of catalyst and reactive compound. The greater the surface (contact) area is, the higher the efficiency. The basic function of a catalyst support is to enable the catalyst particles to retain a separated status as much as possible and therefore enable the active catalyst particles adequately contact the reactive compounds to promote the chemical reactions. In the high temperature environment of engine exhaust, the carrier material supporting the catalytic reactive noble metal must have superior thermal resistance capability. Thus, at high temperature, especially at 1200° C., the carrier material can still retain a high surface area.

The common alumina support has poor thermal resistance capability characterized by a high temperature phase formation, collapse of most pores and a sudden drop of surface area below 10 $m^2/g$ at 1200° C.

In the 1970's, some US patents disclosed the methods of making catalyst support materials, i.e., impregnating transition alumina with soluble rare earth salts in solution followed by the separation of the liquid from the solids and calcinations of the solids in order to improve alumina thermal stability.

In 1977, U.S. Pat. No. 4,061,594 disclosed a method of making alumina of high resistance to high temperature by impregnating solutions of rare earth nitrates, chlorides and acetates, in which the rare earth elements included La, Pr, Nd and Th. But the effect is not obvious because the aged SA at up to 1200° C. quickly decreased as the calcining time was prolonged. For example, the specific surface area after calcination at 1200° C. for 4 hours is not greater than 32 $m^2/g$.

In 1996, U.S. Pat. No. 5,718,879 disclosed another similar method of making heat-stable alumina particulates having a specific surface area of greater than 40 $m^2/g$ after calcination at 1200° C. for 4 hours by ripening/rehydrating an alumina powder at least partially into a boehmite/pseudoboehmite state in the presence of a stabilizing amount of at least one lanthanum compound, e.g. lanthanum nitrate and/or at least one neodymium compound followed by liquid solid separation, drying and calcination. But after calcination at 1200° C. for 24 hours, the aged SA is only 28 $m^2/g$.

U.S. Pat. No. 4,722,920 disclosed a method of making an alumina catalyst support stable at high temperatures comprising a transformative alumina having a purity not less than 99.95% and particle size not greater than 0.5 microns impregnated with lanthanum in amount of 1.5 to 6.0 wt % based on the weight of the alumina. The alumina catalyst support has a surface area of at least 60 $m^2/g$ after heating at 1200° C. for 5 hours for a transformative alumina having a purity of 99.99%, but if the purity is lowered to 99.95% the aged SA is decreased by at least 12%.

SASOL's commercial product, PURALOX-SCFa-140L3 of high-purity ($Na_2O$<20 ppm) was prepared from hydrolysis of aluminum alkoxide. The alumina catalyst support containing 4% $La_2O_3$ has an SA of greater than 40 $m^2/g$ after heating at 1200° C. for 24 hours. The production cost, however, is high for this process.

In industrial production, the precipitation step can be carried out in a tank reactor with a stirrer and temperature controller. The process can be batch or continuous. In general, a continuous process has a higher stability and consistency as well as a higher efficiency than a batch process. The uniformity of the former, however, is lower than that of the latter, which lowers the properties of the product.

SUMMARY OF THE INVENTION

The present invention resolves the above-mentioned problems using a static mixer together with a tank reactor in a continuous coprecipitation method to produce lanthana-alumina with higher stability, consistency and efficiency.

Moreover, the present invention utilizes industrial grade raw materials to produce rare earth alumina particulates of high thermal stability together with a suitable surfactant addition. According to the present invention the process of making rare earth alumina is useful for industrial production.

One object of the present invention is to supply a catalyst support material of high thermal stability even after long-term aging at high temperatures up to 1200° C.

The rare earth alumina has a formula of $(RE_x,Al_{1-x})_2O_3$ and porous structure with a phase of gamma or gamma plus delta, a particle size distribution ranging from 1-80 microns with median $D_{50}$ of 5 to 15 microns, a fresh pore volume of 0.5 to 1.2 cc/g and a fresh surface area of 130-250 $m^2/g$ after calcination at 500 to 900° C.

The rare earth alumina catalyst support according to the invention has an aged SA of greater than 60 $m^2/g$ after calcination at 1200° C. for 4 hours and >40 $m^2/g$ for 50 hours and in which there is no alpha phase.

Another object of the present invention is to manufacture a catalyst support material of high thermal stability with simple procedure and low cost.

BRIEF DESCRIPTION OF THE INVENTION

DETAILED DESCRIPTION OF THE INVENTION

According to the present invention, industrial grades of nitric acid, ammonia, sodium hydroxide, aluminum hydroxide and rare earth carbonates are used to produce rare earth alumina particulates. The details of the invention are described as follows.

The rare earth alumina particulates of the invention have the chemical formula $$(RE_x,Al_{1-x})_2O_3$$

in which, RE denotes an individual or a group of rare earth elements, i.e., La, Ce, Pr, Nd, Sm, Eu, Gd, Tb, Dy, Ho, Er and Tm. Preferably, La, Ce and Nd elements are used individually or in combination with one another. The content x is, in general, 0.005 to 0.04 in moles, preferably 0.01 to 0.03. A La concentration that is too high will result in an impurity phase and a concentration that is too will result in low thermal resistance.

The new rare earth alumina has a particle size distribution ranging from 1-80 microns with median size $D_{50}$ of 5 to 15 microns, a fresh pore volume of 0.5 to 1:2 cc/g and a fresh surface area of 130-250 m²/g after calcination at 500 to 900° C. for 4-10 hours.

The new rare earth alumina has a porous structure with different phases depending on calcination temperature. A gamma phase is formed below 900° C., a gamma plus delta phase below 1100° C. and pure theta phase at 1200° C. There is no alpha phase even after calcination at 1200° C. for 50 hours.

A static mixer and a tank reactor with a stirrer are used at the same time to produce the rare earth alumina in a wet continuous coprecipitation method. The wet method is usually superior over impregnation in uniformity. The use of a static mixer made the reaction more complete and more uniform. The wet method flowchart is as follows:

Solution preparation→Coprecipitation→Aging→Separation of Solid-Liquid→Washing→Drying→Calcination The method is described in detail as follows:

Solution Preparation

The acidic method is used for coprecipitation in the present invention.

The basic solution is $NaAlO_2$, in which the $Al_2O_3$ content is 50-400 g/L, in general 100-200 g/L, preferably 150 to 200 g/L. The basicity of the solution is determined by the ratio of Na/Al and $Al_2O_3$ content. Generally, the ratio of Na/Al ranges from 1.2 to 2. If it is too low, the aluminum hydroxide will precipitate whereas if it is too high, the process will use too much acid. A stable solution has a basicity ranging from 6 to 10 mol/L [OH⁻].

The acidic solution is a rare earth nitrate aqueous solution, in which the acidity is related to the basicity of the basic solution, and they may or may not be the same. The acidity $K_2$ of the rare earth nitrate solution can be determined according to the rare earth oxide content $C_2$ in acidic solution, the basicity $K_1$ and $Al_2O_3$ content $C_1$ in the basic solution, the flowrate ratio of $v_1/v_2$ as well as the oxides weight ratio in the precipitate $N_1/N_2$:

$$(C_1/C_2) \times (v_1/v_2) \times (K_2/K_1) = N_1/N_2$$

In particular, when flowrates, basicity and acidity are all equal, the oxides ratio of the solution is equal to the precipitate oxides ratio.

Coprecipitation

A static mixer was introduced to the common tank reactor with stirrer in order to improve the uniformity of the precipitate.

The difference between coprecipitations with and without the static mixer is the feeding method. The common continuous precipitation is carried out by pumping acidic and basic solution directly into a tank reactor with stirring and bottom water which dilutes and mixes the two solutions to realize a neutralization reaction. The slurry, with precipitate, will go from the outlet on the top of the tank reactor into a storage tank.

In the present invention, both the static mixer and the tank reactor are used at the same time. The bottom water is first pumped out to mix with one or each of two solutions, then the solutions enter the static mixer to neutralize. The resultant precipitate flows into the tank reactor with stirring. After the tank reactor is full, the precipitate slurry will overflow out of the outlet on the top of the tank reactor into the storage tank. The chemical reaction is finished before the slurry flows out of the static mixer.

The static mixer is comprised of multiple right and left-handed-screw passages. When two different solutions enter into the inlet, an overfall forms resulting in uniform mixing and chemical reaction happening in the radial direction.

The coprecipitation temperature is in general at 35 to 80° C., preferably 40 to 70° C. and the pH can be chosen to be in the range of 6 to 9, preferably 7 to 9. Under this condition pseudo-boehmite can be precipitated.

Aging

It is common to retain the slurry at the precipitation temperature and pH for a period of several hours to age the precipitate in order to get a more uniform product when coprecipitation is finished or the tank reactor is full in a batch process. In the present invention, when the storage tank is full of slurry, the aging can start. The aging period is in general 0 to 5 hours, preferably 0.5 to 1 hour. During aging, one or more organic surfactants, such as polyvinyl alcohol (PVA), polyvinyl amine, polyethylene glycol-200 (PEG-200), triton X-100, isopropyl alcohol and ethanol, can be used for enlarging pore size. The dosage is 0.1%-10% (preferably 1% to 5%) and it is based on the rare earth alumina.

Separation of Solid-Liquid

The precipitate in the slurry should be separated from the sodium nitrate solution to get a wet cake precipitate. The solid-liquid separation can be carried out using vacuum filtration, frame pressure filtration, and also centrifugal dehydration.

Washing

After the separation of solid-liquid, the precipitate wet cake contains a high level of sodium nitrate. A washing process is quite important for the purity of the final product because Sodium can act as a poison to the catalyst. The sodium content in the final rare earth alumina product should be in general less than 0.1%, preferably less than 0.06%, most preferably less than 0.04%. For removing sodium, a D.I. water having a conductance of less than 5 μS/cm and pH of 5 to 9.5 is preferred. In general, an amount of 30 to 50 times D.I. water should be used in washing in order to get pure rare earth alumina.

Drying

The drying process can be carried out in an oven, flash dryer or spray dryer. The drying temperature can be set between 80 and 350° C.

Calcination

A muffle furnace or tunnel furnace can be used to calcine the rare earth alumina, preferably a tunnel furnace because of its continuous process and power savings. The calcining temperature is in general between 500 and 1000° C., preferably between 550 and 900° C. And the calcining period is in general between 3 and 10 hours, preferably between 4 and 6 hours.

Spray pyrogenation can directly get the final product from the slurry of washed precipitate. The rare earth alumina obtained by the method above-described is a three-way catalyst support material of high thermal stability.

The HORIBA LA-920 laser particle sizer was used for the measurement of particle size distribution, Japan Rigaku D/max 2550VB/PC X-ray polycrystalline difflactometry was used for the measurement of phase, Micromeritics ASAP 2000 was used for the measurement of BET and the HORIBA Jobin Yvon Y ULTIMA2 ICP was used for analysis of chemical composition.

Example 1

A static mixer was taken as a reactor using a basic solution of sodium aluminate with basicity of 10 mol/L and concentration of 400 g/L $Al_2O_3$ and an acidic solution of lanthanum nitrate of acidity of 2.7 mol/L and concentration of 5.4 g/L $La_2O_3$. A 500 L tank reactor with stirrer and D.I. 400 L bottom water was used together with the static mixer for coprecipitation. The pH and temperature T of precipitation were 8.5 and 62° C., respectively.

First, the bottom water was pumped into one of the two inlets of the static mixer through a T connector between the pump and the mixer. Then the water flowed from the outlet of the static mixer into the tank reactor and formed a cyclic current. After the temperature of the water was stabilized at 62° C., the basic solution was pumped into the static mixer through the T connector and the acidic solution was directly pumped into another inlet of the static mixer. Mixing, reaction and coprecipitation happened when the two solutions met in the mixer. The precipitate slurry entered into the tank reactor with stirring and was diluted. The diluted slurry was pumped and mixed with basic solution and then entered into the static mixer. After the tank reactor was full of slurry of precipitate, the precipitate flowed from the outlet on the top of the tank reactor and into the storage tank. The process of precipitation finished after 10 hours when the storage tank was full of the slurry.

Figure 1:
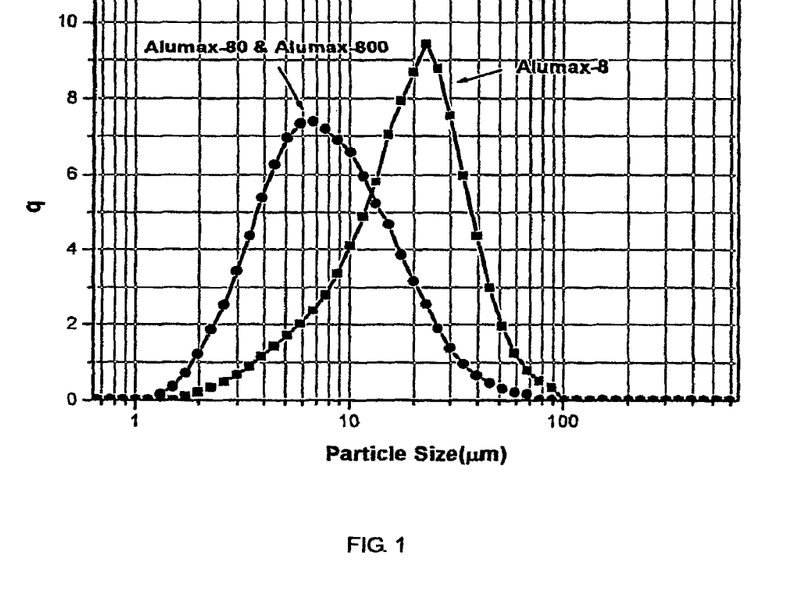
FIG. 1 illustrates Particle size distributions of Alumax-8, Alumax-80 and Alumax-800 products.
Figure 2:
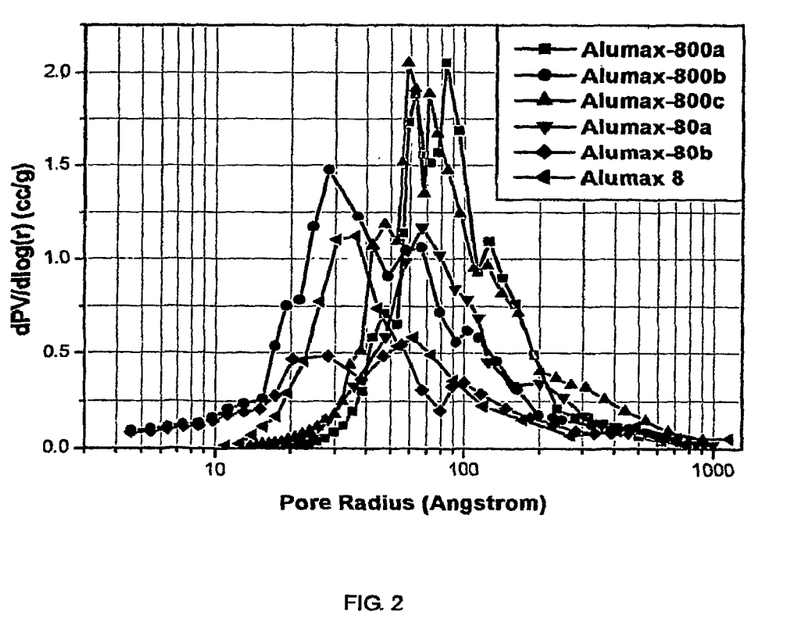
FIG. 2 illustrates Pore size distributions of Alumax-8, Alumax-80 and Alumax-800 products.
Figure 3:
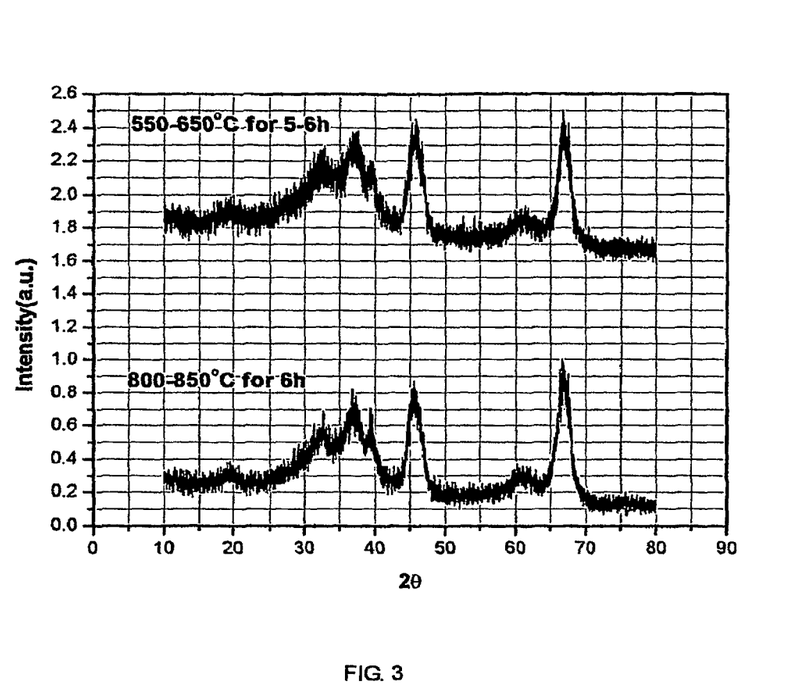
FIG. 3 illustrates XRD patterns of γ phase La-alumina Alumax-8, Alumax-80 and Alumax-800 products fired at 550-650° C. and 850° C.
Figure 4:
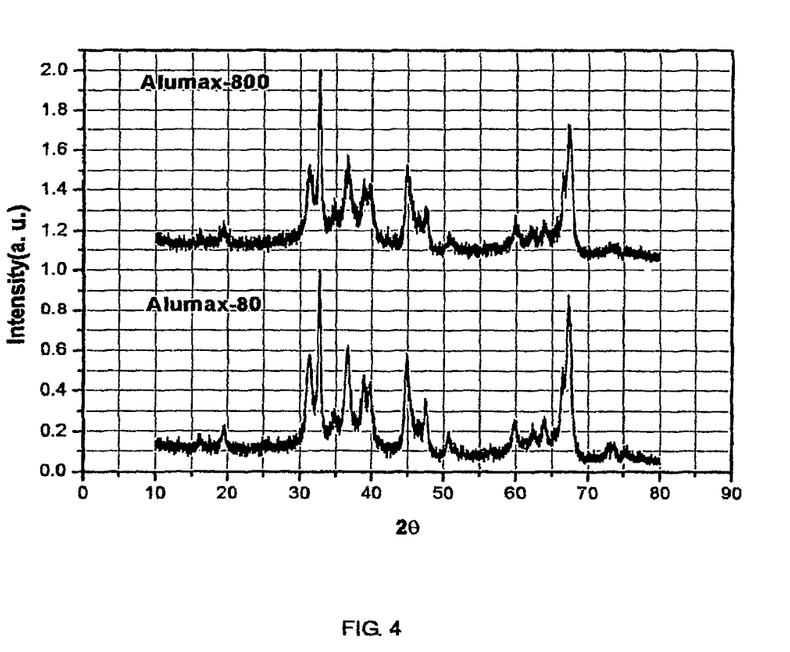
FIG. 4 illustrates XRD patterns of θ phase La-alumina Alumax-80 and Alumax-800 products fired at 1200° C. for 4 hours.
Figure 5:
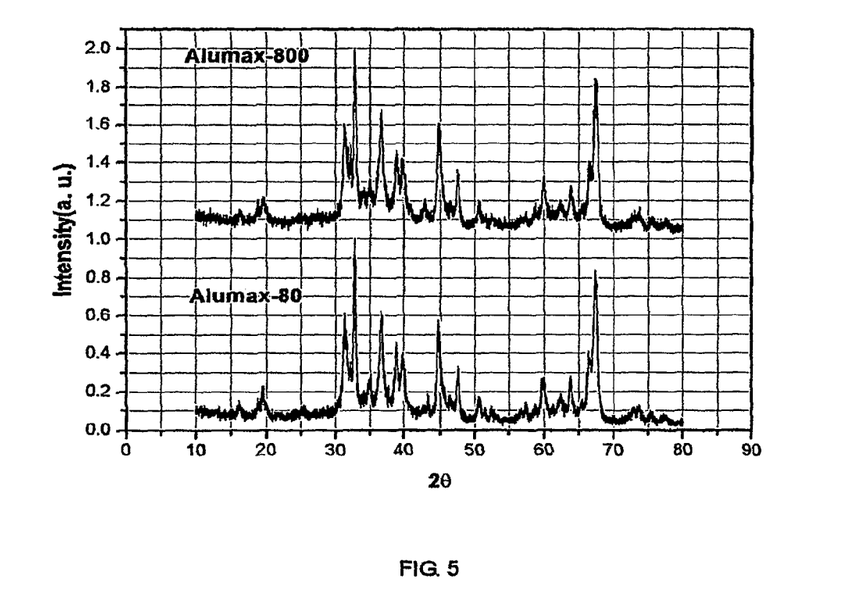
FIG. 5 illustrates XRD patterns of θ phase La-alumina Alumax-80 and Alumax-800 products fired at 1200° C. for 50 hours.

A surfactant PEG-200 of 3 wt. % based on the total rare earth alumina was added into the storage tank. After blending 30 min, the slurry was pumped into a frame pressure filter for separation of solid-liquid. When the wet cake was formed, a washing process started using D.I. water. An amount of 40 times pH 9 water based on the oxides in the wet cake was used for washing. Then the washed wet cake is dried using a flash dryer. The resultant pseudo-boehmite, aluminum monohydroxide containing lanthanum hydroxide, was fired at 850° C. for 6 hours and fresh alumina containing 3.9% $La_2O_3$ and 0.038% $Na_2O$ was obtained. The particulates have a $D_{50}$ of 7.0 μm with a size distribution ranging from 1.32 to 80 μm as shown in FIG. 1 (Alumax-80). BET measurement gave a surface area of 145 $m^2/g$, pore volume of 0.65 cc/g and averaged pore diameter of 17.9 nm. A BJH $N_2$ desorption pore size distribution ranged from 4-200 nm was shown in FIG. 2 (Alumax-80a). The XRD pattern showed a gamma phase (FIG. 3). After calcination at 1200° C. for 4 hours the sample had an aged SA of 55 $m^2/g$ and its XRD showed a theta phase (FIG. 4, Alumax-80). After calcination at 1200° C. for 50 hours, the sample still retained a SA of 31 $m^2/g$. An XRD pattern showed a pure theta phase without any impurity phase such as alpha phase and $LaAlO_3$ (FIG. 5, Alumax-80)

Example 2

A static mixer was taken as a reactor using a basic solution of sodium aluminate with basicity of 6 mol/L and concentration of 200 g/L $Al_2O_3$ and an acidic solution of lanthanum nitrate of acidity of 3 mol/L and concentration of 4.5 g/L $La_2O_3$. A 500 L tank reactor with stirrer and D.I. 400 L bottom water was used together with the static mixer for coprecipitation.

The other coprecipitation conditions were the same as example 1 except that both basic and acidic solutions were first mixed with slurry before entering the inlets of the static mixer.

The washed wet cake was dried using an oven at 120° C. overnight. A crusher was used to crush the dried wet cakes into powder. The resultant pseudo-boehmite, aluminum monohydroxide containing lanthanum hydroxide, was fired at 850° C. for 6 hours and fresh alumina was obtained containing 4.2% $La_2O_3$ and 0.023% $Na_2O$. The particulates have a $D_{50}$ of 8.34 μm with a size distribution similar to FIG. 1 (Alumax-800). BET measurement gave a surface area of 144.2 $m^2/g$, pore volume of 0.86 cc/g and an averaged diameter of 17.9 nm. A BJH $N_2$ desorption pore size distribution ranging from 6-160 nm was shown in FIG. 2 (Alumax-800a). The XRD pattern showed a gamma phase (FIG. 3). After calcination at 1200° C. for 4 hours, the sample had an aged SA of 58.8 $m^2/g$ and its XRD showed a theta phase (FIG. 4, Alumax-80). After calcination at 1200° C. for 50 hours, the sample still retained a SA of 38 $m^2/g$. An XRD pattern showed a pure theta phase without any impurity phase such as alpha phase and $LaAlO_3$ (FIG. 5, Alumax-800).

Example 3

Except that the coprecipitation temperature was 48° C., the other specifics were the same as example 2. Fresh sample was obtained containing 4.3% $La_2O_3$ and 0.021% $Na_2O$. The particulates have a $D_{50}$ of 8.9 μm with a size distribution similar to example 2 (FIG. 1, Alumax-800). BET measurement gave a surface area of 155.1 $m^2/g$, pore volume of 0.96 cc/g and averaged pore diameter of 24.8 nm. A BJH $N_2$ desorption pore size distribution was similar to example 2 (FIG. 2, Alumax-800a). The XRD pattern showed a gamma phase (FIG. 3). After calcination at 1200° C. for 4 hours, the sample had an aged SA of 61 $m^2/g$ and its XRD showed a theta phase (FIG. 4, Alumax-80). After calcination at 1200° C. for 50 hours, the sample still retained a SA of 44 $m^2/g$. An XRD pattern showed a pure theta phase without any impurity phase such as alpha phase and $LaAlO_3$ (FIG. 5, Alumax-800).

Example 4

A static mixer was taken as a reactor using a basic solution of sodium aluminate with basicity of 6.5 mol/L and concentration of 175 g/L $Al_2O_3$ and an acidic solution of lanthanum nitrate of acidity of 3.3 mol/L and concentration of 4 g/L La₂O₃. A 50 L tank reactor with stirrer and D.I. 40 L bottom water was used together with the static mixer for coprecipitation.

Other coprecipitation conditions were the same as example 1 except that only acidic solutions were first mixed with slurry before entering the inlets of the static mixer.

The solid-liquid separation and washing were carried out in a vacuum filter. The washed wet cake was then dried in an oven at 120° C. overnight. A crusher was used to crush the dried wet cake into powder. The resultant pseudo-boehmite, aluminum monohydroxide containing lanthanum hydroxide, was fired at 550° C. for 4 hours and fresh alumina was obtained containing 4.07% $La_2O_3$ and 0.015% $Na_2O$. The particulates have a $D_{50}$ of 9.3 μm with a size distribution similar to FIG. 1 (Alumax-80). BET measurement gave a surface area of 163 m²/g, pore volume of 0.64 cc/g and averaged pore diameter of 15.7 nm. A BJH $N_2$ desorption pore size distribution ranging from 0.4 to 160 nm was shown in FIG. 2 (Alumax-80b). The XRD pattern showed a gamma phase (FIG. 3). After calcination at 1200° C. for 4 hours, the sample had an aged SA of 58.0 m²/g, pore volume is 0.373 cc/g and its XRD showed a theta phase (FIG. 4, Alumax-80). After calcination at 1200° C. for 50 hours, the sample still retained a SA of 41 m²/g. An XRD pattern showed a pure theta phase without any impurity phase such as alpha phase and $LaAlO_3$ (FIG. 5, Alumax-80).

Example 5

Except that the coprecipitation temperature was 48° C., the other specifics were the same as example 4. Fresh sample was obtained containing 3.86% $La_2O_3$ and 0.007% $Na_2O$. The particulates have a $D_{50}$ of 11.19 μm with a size distribution similar to example 2 (FIG. 1, Alumax-800). BET measurement gave a surface area of 217 m²/g, pore volume of 1.07 cc/g and averaged pore diameter of 19.7 nm. A BJH $N_2$ desorption pore size distribution ranging from 0.4 to 160 nm was shown in FIG. 2 (Alumax-800b). The XRD pattern showed a gamma phase (FIG. 3). After calcination at 1200° C. for 4 hours, the sample had an aged SA of 67 m²/g and its XRD showed a theta phase (FIG. 4, Alumax-800). After calcination at 1200° C. for 50 hours, the sample still retained a SA of 44 m²/g. An XRD pattern showed a pure theta phase without any impurity phase such as alpha phase and $LaAlO_3$ (FIG. 5, Alumax-800).

Example 6

Except that no surfactant was added into the slurry, the other specifics were the same as example 4. Fresh sample was obtained containing 3.91% $La_2O_3$ and 0.010% $Na_2O$. The particulates have a $D_{50}$ of 11 μm with a size distribution similar to example 2 (FIG. 1, Alumax-800). BET measurement gave a surface area of 198 m²/g, pore volume of 0.97 cc/g and averaged pore diameter of 19.6 nm. A BJH $N_2$ desorption pore size distribution was similar to example 2 (FIG. 2, Alumax-800a). The XRD pattern showed a gamma phase (FIG. 3). After calcination at 1200° C. for 4 hours, the sample had an aged SA of 59 m²/g and its XRD showed a theta phase (FIG. 4, Alumax-800). After calcination at 1200° C. for 50 hours, the sample still retained a SA of 37 m²/g. An XRD pattern showed a pure theta phase without any impurity phase such as alpha phase and $LaAlO_3$ (FIG. 5, Alumax-800).

Example 7

Comparative 1

Figure 6:
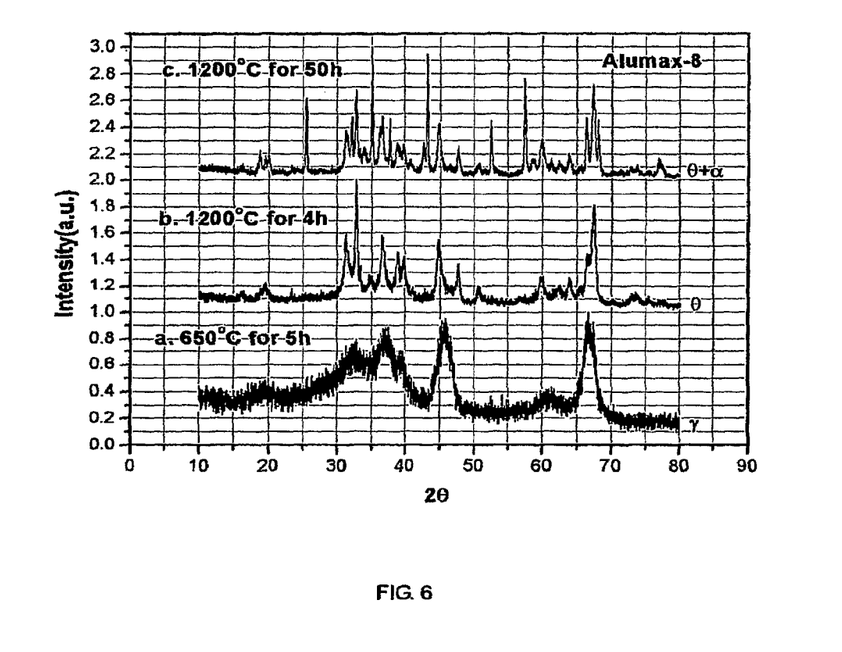
FIG. 6 illustrates XRD patterns of γ (a), θ (b) and θ plus α (c) phases of La-alumina Alumax 8 product.

Except that the basic and acidic solutions were directly pumped into the tank reactor without static mixer and the fresh sample was obtained after calcination at 650° C. for 5 hours, the other specifics were the same as example 6. The fresh sample contained 4.2% $La_2O_3$ and 0.024% $Na_2O$. The particulates have a $D_{50}$ of 18.1 μm with a size distribution ranging from 1.51 to 100 μm as shown in FIG. 1 (Alumax-8). BET measurement gave a surface area of 205 m²/g, pore volume of 0.65 cc/g and averaged pore diameter of 12.7 nm. A BJH $N_2$ desorption pore size distribution ranging from 2-200 nm is shown in FIG. 2 (Alumax-8). The XRD pattern showed a gamma phase (FIG. 6a). After calcination at 1200° C. for 4 hours, the sample had an aged SA of 48 m²/g and its XRD showed a theta phase (FIG. 6b, Alumax-8). After calcination at 1200° C. for 50 hours, the sample only retained a SA of 16.8 m²/g. An XRD pattern showed theta plus alpha phases (FIG. 6c, Alumax-8).

Example 8

Comparative 2

Except that the coprecipitation temperature was 65° C. and pH was 7, the other specifics were the same as comparative 1. The fresh sample contained 3.8% $La_2O_3$ and 0.028% $Na_2O$. The particulates have a $D_{50}$ of 21.19 μm with a size distribution ranging from 1.51 to 100 μm as shown in FIG. 1 (Alumax-8). BET measurement gave a surface area of 198 m²/g, pore volume of 0.68 cc/g and averaged pore diameter of 13.7 nm. A BJH $N_2$ desorption pore size distribution was similar to example 7 (FIG. 2, Alumax-8). The XRD pattern showed a gamma phase (FIG. 6a). After calcination at 1200° C. for 4 hours, the sample had an aged SA of 50 m²/g and its XRD showed a theta phase (FIG. 6b, Alumax-8). After calcination at 1200° C. for 50 hours, the sample only retained a SA of 17.8 m²/g. An XRD pattern showed theta plus alpha phases (FIG. 6c, Alumax-8).

The XRD pattern showed a gamma phase (FIG. 3). After calcination at 1200° C. for 4 hours, the sample had an aged SA of 59 m²/g and its XRD showed a theta phase (FIG. 4, Alumax-800). After calcination at 1200° C. for 50 hours, the sample still retained a SA of 37 m²/g. An XRD pattern showed a pure theta phase without any impurity phase such as alpha phase and $LaAlO_3$ (FIG. 5, Alumax-800).

Example 9

The rare earth solution was $Ce(NO_3)_3$ with $CeO_2$ concentration of 5.4 g/L and a acidity of 2.7 mol/L. The basic solution was sodium aluminate with $Al_2O_3$ concentration of 400 g/L and a basicity of 10 mol/L. The coprecipitation was carried out for 2 hours using static mixer together with tank reactor. There is no surfactant added in the slurry during coprecipitation and aging processes. The calcination of fresh sample was carried out at 800° C. for 6 hours. The other specifics were the same as example 3. The fresh sample contained 3.7% $CeO_2$ and 0.021% $Na_2O$. The particulates had a $D_{50}$ of 9.0 μm with a size distribution ranging from 1.32 to 80 μm as shown in FIG. 1 (Alumax-80). BET measurement gave a surface area of 162 m²/g, pore volume of 0.80 cc/g and averaged pore diameter of 20.4 nm. A BJH $N_2$ desorption pore size distribution was similar to example 1 (FIG. 2, Alumax-80a). The XRD pattern showed a gamma phase (FIG. 3). After calcination at 1200° C. for 4 hours, the sample had an aged SA of 51 m²/g and its XRD showed a theta phase (FIG. 4, Alumax-80). After calcination at 1200° C. for 50 hours, the sample still retained a SA of 27 m²/g. An XRD pattern showed a pure theta phase without any impurity phase such as alpha phase or $LaAlO_3$ (FIG. 5, Alumax-80).

Example 10

Except that the rare earth solution is $Nd(NO_3)_3$, the other specifics were the same as example 9. The fresh sample contained 4.5% $Nd_2O_3$ and 0.018% $Na_2O$. The particulates had a $D_{50}$ of 8.6 μm with a size distribution ranging from 1.32 to 80 μm as shown in FIG. 1 (Alumax-800). BET measurement gave a surface area of 189 $m^2/g$, pore volume of 0.90 cc/g and averaged pore diameter of 19.7 nm. A BJM $N_2$ desorption pore size distribution was similar to example 7 (FIG. 2, Alumax-800c). The XRD pattern showed a gamma phase (FIG. 3). After calcination at 1200° C. for 4 hours, the sample had an aged SA of 67 $m^2/g$ and its XRD showed a theta phase (FIG. 4, Alumax-800). After calcination at 1200° C. for 50 hours, the sample still retained a SA of 29 $m^2/g$. An XRD pattern showed a pure theta phase without any impurity phase such as alpha phase or $LaAlO_3$ (FIG. 5, Alumax-800).

Example 11

Except that the rare earth solution is $(La, Ce, Pr, Nd)(NO_3)_3$ with a total rare earth concentration of 5.4 g/L and $La_2O_3$:$CeO_2$:$Pr_6O_{11}$:$Nd_2O_3$ ratio of 0.70:0.14:0.07:0.16, the other specifics were the same as example 9. The fresh sample contained 3.0% $La_2O_3$, 0.61% $CeO_2$, 0.30% $Pr_6O_{11}$ and 0.71% $Nd_2O_3$ as well as 0.023% $Na_2O$. The particulates had a $D_{50}$ of 8.9 μm with a size distribution ranging from 1.32 to 80 μm as shown in FIG. 1 (Alumax-800). BET measurement gave a surface area of 199 $m^2/g$, pore volume of 1.00 cc/g and averaged pore diameter of 20.0 nm. A BJH $N_2$ desorption pore size distribution was similar to example 7 (FIG. 2, Alumax-800c). The XRD pattern showed a gamma phase (FIG. 3). After calcination at 1200° C. for 4 hours, the sample had an aged SA of 81 $m^2/g$ and its XRD showed a theta phase (FIG. 4, Alumax-800). After calcination at 1200° C. for 50 hours, the sample still retained a SA of 54 $m^2/g$. An XRD pattern showed a pure theta phase without any impurity phase such as alpha phase or $LaAlO_3$ (FIG. 5, Alumax-800).

Example 12

Except that 3 wt. % PEG surfactant was used in the aging process based on the oxides weight, the other specifics was the same as example 9. The fresh sample had a surface area of 170 $m^2/g$, pore volume of 0.82 cc/g and averaged pore size of 19.3 nm. The samples aged at 1200° C. for 4 h and 50 h still retained a surface area of 55 $m^2/g$ and 31 $m^2/g$, respectively. The other results were similar to example 9.

Example 13

Except that 3 wt. % PEG surfactant was used in the aging process based on the oxides weight, the other specifics was the same as example 10. The fresh sample had a surface area of 193 $m^2/g$, pore volume of 0.93 cc/g and averaged pore size of 19.9 nm. The samples aged at 1200° C. for 4 h and 50 h still retained a surface area of 72 $m^2/g$ and 39 $m^2/g$, respectively. The other results were similar to example 10.

Example 14

Except that 3 wt. % PEG surfactant was used in the aging process based on the oxides weight, the other specifics were the same as example 11. The fresh sample had a surface area of 200 $m^2/g$, pore volume of 0.96 cc/g and averaged pore size of 19.2 nm. The samples aged at 1200° C. for 4 h and 50 h still retained a surface area of 80 $m^2/g$ and 57 $m^2/g$, respectively. The other results were similar to example 11.

What is claimed is:

1. A calcined alumina catalyst support with at least one rare earth oxide as a stabilizer having a chemical formula $(RE_x, Al_{1-x})_2O_3$, in which, RE denotes one or more rare earth elements selected from the group: La, Ce, Pr, Nd, Sm, Eu, Gd, Tb, Dy, Ho, Er and Tm; the alumina catalyst support being characterized by a rare earth molar content x of 0.005 to 0.04, and after calcination at 1200° C. for 50 hours the alumina catalyst support comprises a surface area (SA) in excess of 30 $m^2/g$ and a theta phase absent the presence of any alpha phase.

2. The alumina catalyst support according to claim 1 wherein the rare earth alumina is characterized by a rare earth molar content x of 0.01 to 0.03.

3. The alumina catalyst support according to claim 1 wherein the rare earth alumina prior to calcination is characterized by a gamma phase.

4. The alumina catalyst support according to claim 1 wherein the rare earth alumina has a particle size distribution ranging from 1-80 microns with a median size $D_{50}$ of 5 to 15 microns.

5. The alumina catalyst support according to claim 1 wherein the rare earth alumina has a fresh pore volume of 0.5 to 1.2 cc/g and a fresh surface area of 130-250 $m^2/g$ after calcination at 500 to 900° C. for 4-10 hours.

6. The alumina catalyst support according to claim 1 wherein the rare earth alumina retains an SA of greater than 80 $m^2/g$ after calcination at 1200° C. for 4 hours.

7. The alumina catalyst support according to claim 6 wherein the rare earth alumina retains an SA of greater than 55 $m^2/g$ after calcination at 1200° C. for 50 hours.

8. The alumina catalyst support according to claim 1 wherein the method of making the rare earth alumina includes wet coprecipitation using a static mixer together with a tank reactor.

9. The alumina catalyst support according to claim 8 wherein the rare earth alumina is prepared by continuous coprecipitation.

10. The alumina catalyst support according to claim 8 wherein the method is an acidic method, with a basic solution of sodium aluminate and an acidic solution of lanthanum nitrate.

11. The alumina catalyst support according to claim 10 wherein the coprecipitation pH ranges from 7-9.

12. The alumina catalyst support according to claim 8 wherein the coprecipitation temperature is from 35 to 90° C.

13. The alumina catalyst support according to claim 8 wherein the method does not include the addition of any surfactants during aging.

14. The alumina catalyst support according to claim 8 wherein the method includes the addition of a dosage of 0.1%-10% based on the rare earth alumina of at least one surfactant selected from the group: polyvinyl alcohol (PVA), polyvinyl amine, polyethylene glycol-200 (PEG-200), triton X-100, isopropyl alcohol and ethanol.

15. The alumina catalyst support according to claim 14 wherein the dosage is 1% to 5% based on the rare earth alumina.

16. The alumina catalyst support according to claim 1 wherein the rare earth alumina is obtained by calcining pseudo-boehmite, aluminum monohydroxide containing rare earth hydroxide, at 500 to 900° C. for 4 to 10 hours.

17. A method of manufacturing an alumina catalyst support comprising the steps of:

a. preparing a basic solution containing $Al_2O_3$ and an acidic solution containing at least one rare earth nitrate, b. mixing together the basic and acidic solutions causing coprecipitation in the form of a slurry, c. aging the coprecipitation slurry and optionally adding one or more surfactants during the aging, d. separating the coprecipitate from the solution to obtain a wet cake precipitate, e. washing the wet cake precipitate to remove remnants of the solution containing elements that poison the catalyst and thereby to produce a pure rare earth alumina, f. drying the rare earth alumina, and g. calcining the rare earth alumina to obtain the alumina catalyst support having a chemical formula $(RE_x,Al_{1-x})_2O_3$, in which, RE denotes one or more rare earth elements selected from the group: La, Ce, Pr, Nd, Sm, Eu, Gd, Tb, Dy, Ho, Er and Tm; the alumina catalyst support being characterized by a rare earth molar content x of 0.005 to 0.04 and after calcination at 1200° C. for 50 hours, the alumina catalyst support comprises a surface area (SA) in excess of 30 $m^2/g$ and a theta phase absent the presence of any alpha phase.

* * * * *

UNITED STATES PATENT AND TRADEMARK OFFICE
CERTIFICATE OF CORRECTION

| | | |
|---|---|---|
| PATENT NO. | : 8,629,077 B2 | Page 1 of 1 |
| APPLICATION NO. | : 12/675664 | |
| DATED | : January 14, 2014 | |
| INVENTOR(S) | : Yunkui Li | |

It is certified that error appears in the above-identified patent and that said Letters Patent is hereby corrected as shown below:

<u>On the Title Page</u>

Below Item (54)

(76)  Inventor:  Yunkui Li, Ann Arbor, MI (US)

should read

(75)  Inventor:  Yunkui Li, Ann Arbor, MI (US)

Insert --(74) Attorney, Agent, or Firm – Brinks Gilson & Lione--

Signed and Sealed this
Twenty-ninth Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,629,077 B2                                           Page 1 of 1
APPLICATION NO. : 12/675664
DATED            : January 14, 2014
INVENTOR(S)      : Yunkui Li It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 183 days.

Signed and Sealed this

Twenty-second Day of September, 2015

Michelle K. Lee
*Director of the United States Patent and Trademark Office*

UNITED STATES PATENT AND TRADEMARK OFFICE
CERTIFICATE OF CORRECTION

PATENT NO. : 8,629,077 B2  
APPLICATION NO. : 12/675664  
DATED : January 14, 2014  
INVENTOR(S) : Yunkui Li Page 1 of 1

It is certified that error appears in the above-identified patent and that said Letters Patent is hereby corrected as shown below:

On the Title Page

Insert --(73) Assignee: PACIFIC INDUSTRIAL DEVELOPMENT CORPORATION  
Ann Arbor, MI (US)

WEIHAI PIDC NEW MATERIALS COMPANY  
Shandong, China (CN)--

Signed and Sealed this  
Third Day of November, 2015

Michelle K. Lee  
*Director of the United States Patent and Trademark Office*